United States Patent
Shiraishi

(10) Patent No.: US 7,800,655 B2
(45) Date of Patent: Sep. 21, 2010

(54) DETECTING ABNORMALITY OF IMAGE CAPTURING APPARATUS

(75) Inventor: Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1443 days.

(21) Appl. No.: 11/014,786

(22) Filed: Dec. 20, 2004

(65) Prior Publication Data

US 2005/0134700 A1 Jun. 23, 2005

(30) Foreign Application Priority Data

Dec. 18, 2003 (JP) ............................. 2003-421498

(51) Int. Cl.
H04N 5/228 (2006.01)
H04N 9/64 (2006.01)
H04N 5/238 (2006.01)
H04N 9/73 (2006.01)
H04N 5/235 (2006.01)
G03B 9/08 (2006.01)
G03B 7/00 (2006.01)

(52) U.S. Cl. .................... 348/222.1; 348/248; 348/364; 348/224.1; 348/230.1; 348/362; 396/452

(58) Field of Classification Search ............. 348/222.1, 348/362, 248; 396/452
See application file for complete search history.

(56) References Cited

U.S. PATENT DOCUMENTS

| | | | | |
|---|---|---|---|---|
| 5,574,520 A | * | 11/1996 | Ishihara | 396/52 |
| 5,898,460 A | * | 4/1999 | Koyama | 348/296 |
| 6,307,393 B1 | * | 10/2001 | Shimura | 324/765 |
| 6,353,709 B1 | * | 3/2002 | Miyazaki et al. | 396/48 |
| 7,193,650 B2 | * | 3/2007 | Oda et al. | 348/248 |
| 7,362,354 B2 | * | 4/2008 | Lin | 348/222.1 |
| 2002/0176013 A1 | * | 11/2002 | Itoh | 348/243 |
| 2003/0001078 A1 | * | 1/2003 | Baharav et al. | 250/208.1 |
| 2003/0147000 A1 | | 8/2003 | Shiraishi | |
| 2003/0169346 A1 | * | 9/2003 | Ojima et al. | 348/207.99 |
| 2004/0056964 A1 | * | 3/2004 | Kawai et al. | 348/211.1 |

(Continued)

FOREIGN PATENT DOCUMENTS

JP  6-284346  10/1994

(Continued)

OTHER PUBLICATIONS

Wen-Chung Kao, 'Automatic sensor and mechanical shutter calibration for digital still cameras,' Nov. 2005, IEEE Transactions on Consumer Electronics, vol. 51, pp. 1060-1066.*

*Primary Examiner*—Jason Chan
*Assistant Examiner*—Michael Osinski
(74) *Attorney, Agent, or Firm*—Oblon, Spivak, McClelland, Maier & Neustadt, L.L.P.

(57) ABSTRACT

A digital still camera having a photographing lens system set in a lens tube, a CCD solid image-capturing device, and a mechanical shutter. The mechanical shutter is set on a light path between the photographing lens system and the CCD solid image capturing device. The CCD solid image-capturing device divides a frame of an image into a plurality of fields and transmits the fields serially. The camera compares at least two fields of them, and detects abnormality caused by, for example, abnormal operation of the mechanical shutter or light leakage of the lens body. The camera also displays or announces the abnormality to a user.

13 Claims, 8 Drawing Sheets

U.S. PATENT DOCUMENTS

2004/0101299 A1* 5/2004 Matsumoto et al. ......... 396/452
2004/0130632 A1 7/2004 Shiraishi

FOREIGN PATENT DOCUMENTS

| JP | 09-130663 | 5/1997 |
| JP | 2001-285688 | 10/2001 |
| JP | 2002-238057 | 8/2002 |
| JP | 2003-87802 | 3/2003 |

* cited by examiner

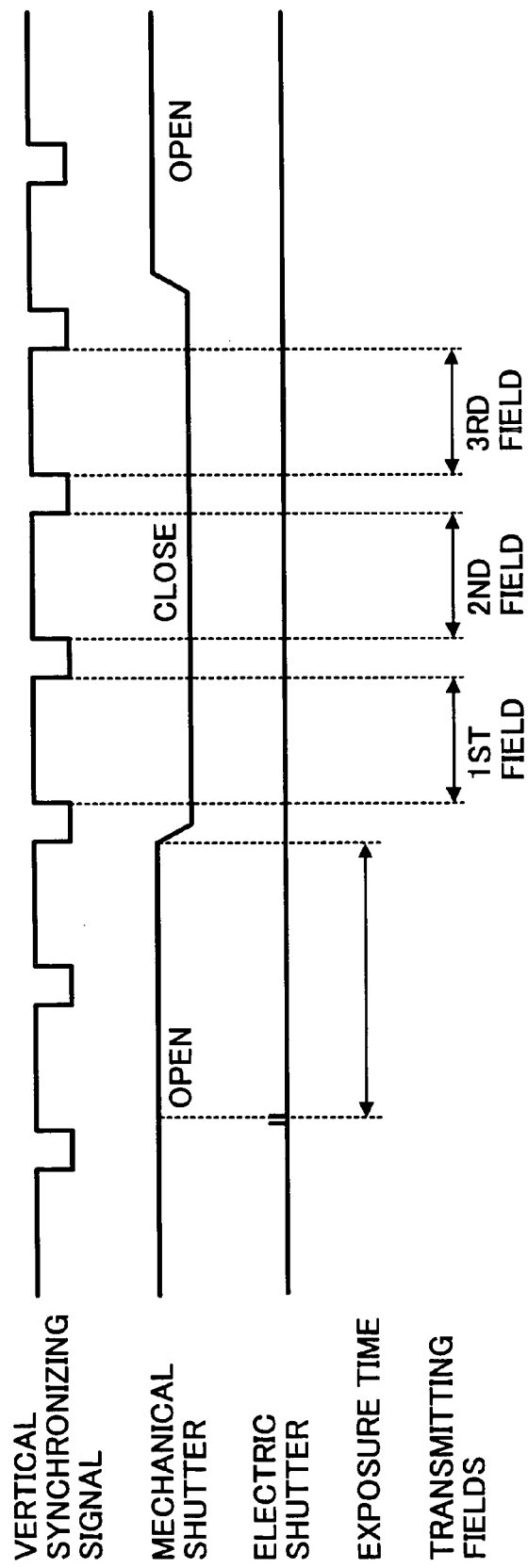

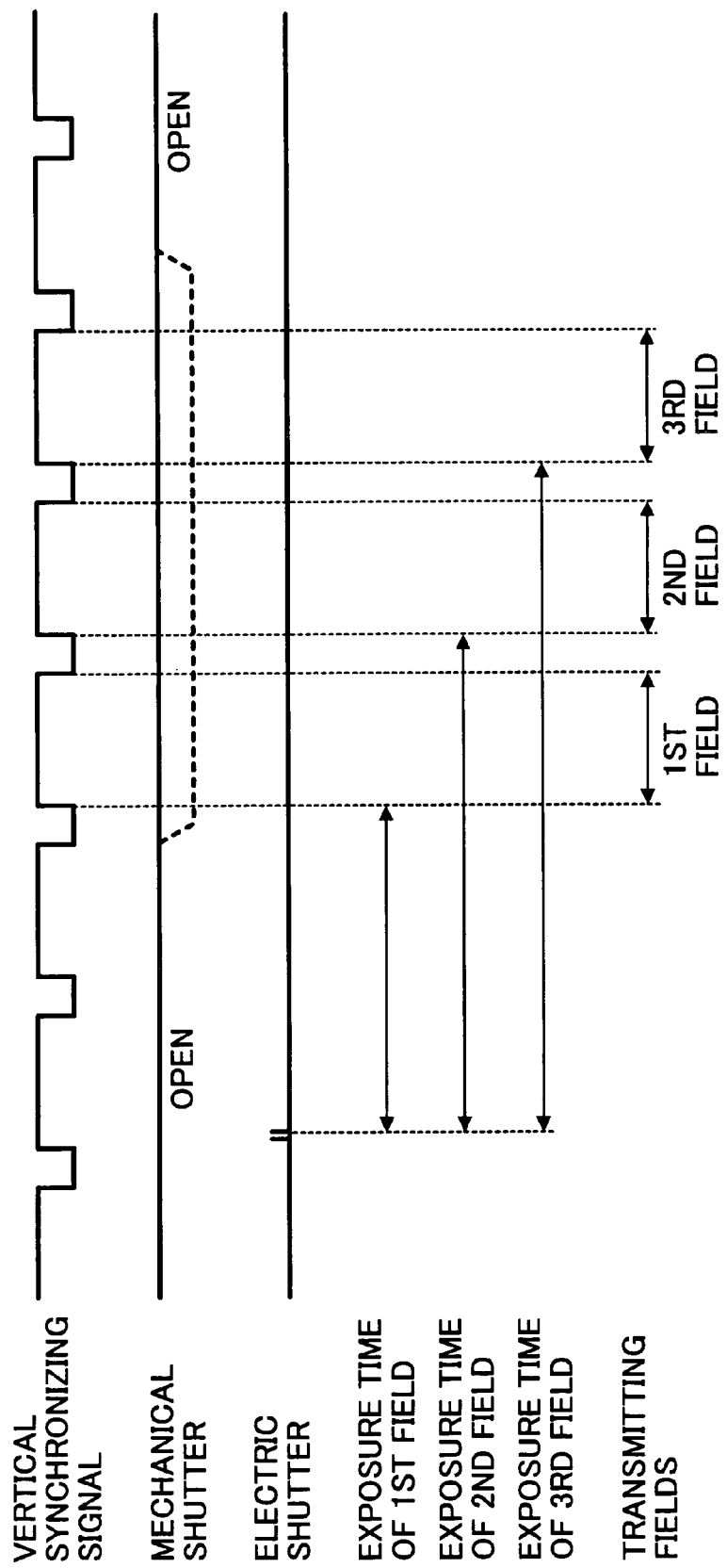

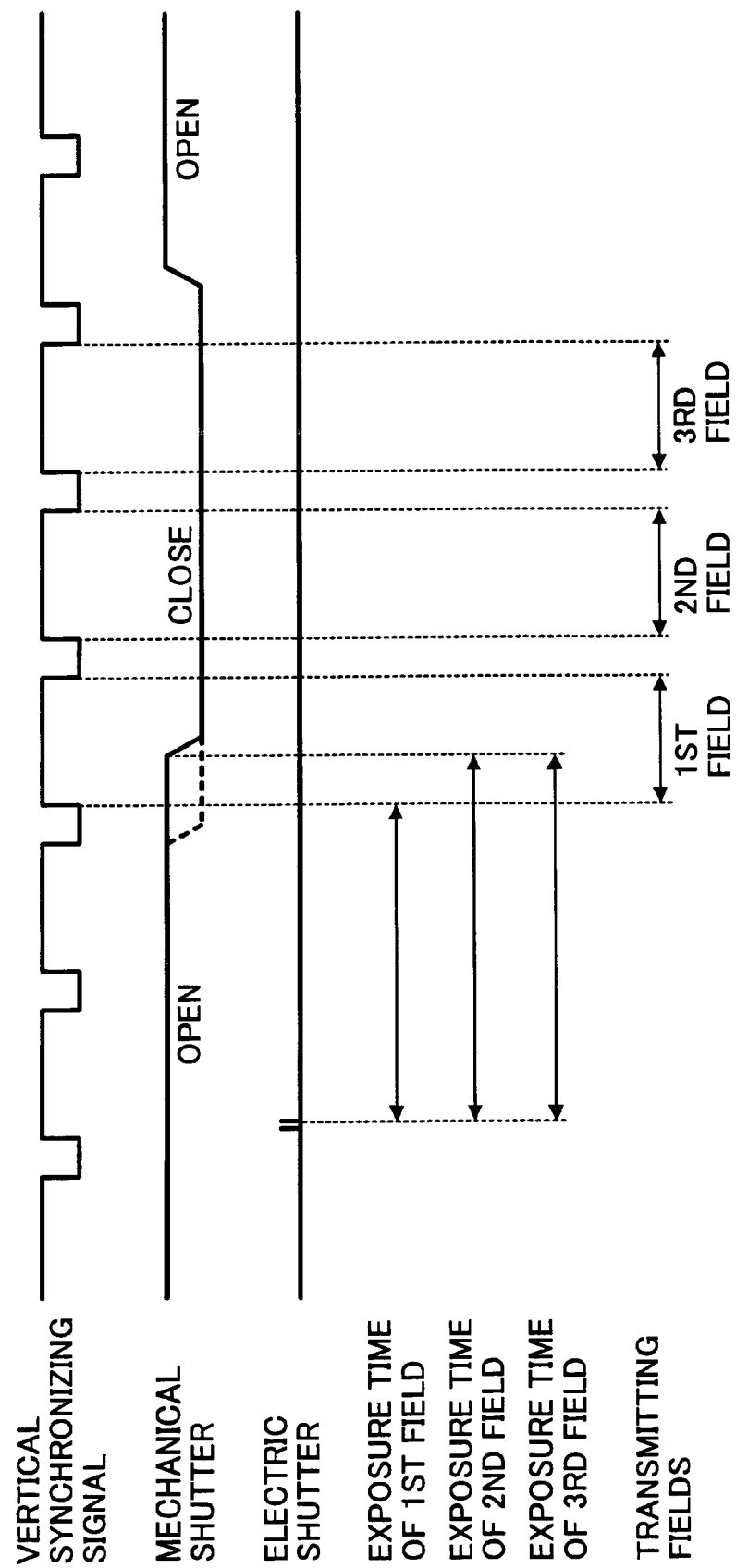

DETECTING ABNORMALITY OF IMAGE CAPTURING APPARATUS

BACKGROUND OF THE INVENTION

1. Field of the Invention

The present invention relates to a technique of an image-capturing apparatus having an image-capturing device. And more particularly to an apparatus, method and computer program suitable for detecting abnormality of an image-capturing apparatus.

2. Discussion of the Background

In an image-capturing apparatus using an interlace-CCD (coupled charge device), a CCD solid image-capturing device is exposed by an at least 2-dimensional optical image projected through an optical system, and converts the optical image to electric signals. After the CCD solid image-capturing device is exposed by the optical image for a predetermined time, the CCD image-capturing device divides a frame of the electric signals into a plurality of fields, and transmits them serially. In this case, a light shield such as a mechanical shutter shuts to prevent an incoming light, and prevents a second or later field from being exposed more during transmission the first field, and makes each field have the same exposure time. Japanese Patent Laid Open No. 2001-285688 describes this type of an image-capturing apparatus having interlace-CCD with a filter of an elementary color system and a mechanical shutter.

SUMMARY OF THE INVENTION

In an image-capturing apparatus like above, the second field is exposed during transmission the first field if light leaks into a lens body. Such leakage makes the value of the second field incorrectly bigger than the first field, because the second field has longer exposure time than the first field. The third field and later fields also have incorrectly bigger values than the second field. This problem can arise when a mechanical shutter fails to shut correctly there by allowing incoming light to leak through to the image-capturing device. Image data taken in these cases include incorrect data. This situation is a serious problem and must be detected and fixed quickly when light leaks into a lens body or a mechanical shutter fails to work correctly.

In view of the foregoing, it is an object of the present invention to provide an image-capturing apparatus, method and computer program that can detect an abnormality in an image-capturing apparatus and indicate or announce to a user that an abnormality exists.

In addition to the novel image-capturing apparatus just described, this patent specification may be implemented in many other specific forms, including in an apparatus, method, or computer program, as will be apparent to those skilled in the relevant art(s), without departing from the spirit or scope of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a timing chart showing timings in three-fields interlace-transmission in the case that a mechanical shutter shuts normally;

FIG. 6 is a timing chart showing timings in three-fields-interlace-transmission in the case that a mechanical shutter fails to shut; and FIG. 7 is a timing chart showing timings in three-fields-interlace-transmission in the case that a mechanical shutter has a delay in the shutting procedure.

DETAILED DESCRIPTION OF PREFERRED EMBODIMENTS

Figure 1A:
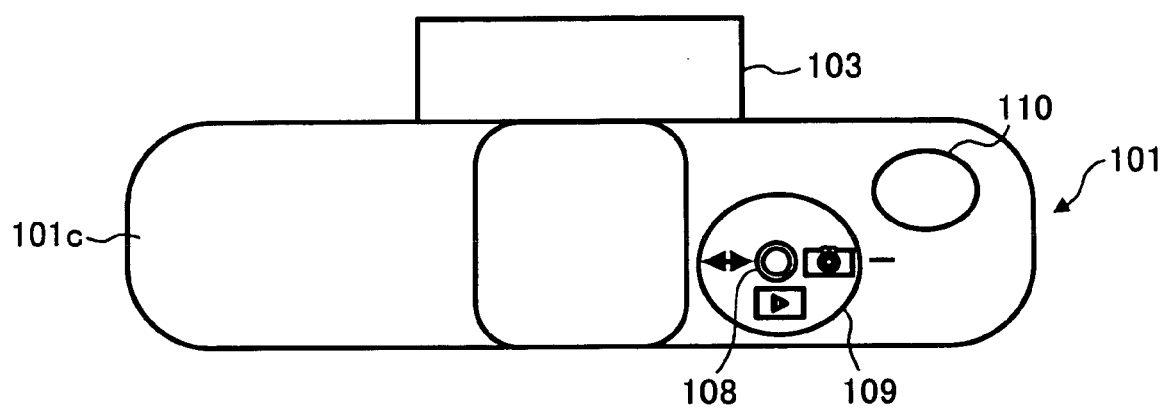
FIG. 1A is a top view of a digital camera relating to an embodiment of the present invention.
Figure 1B:
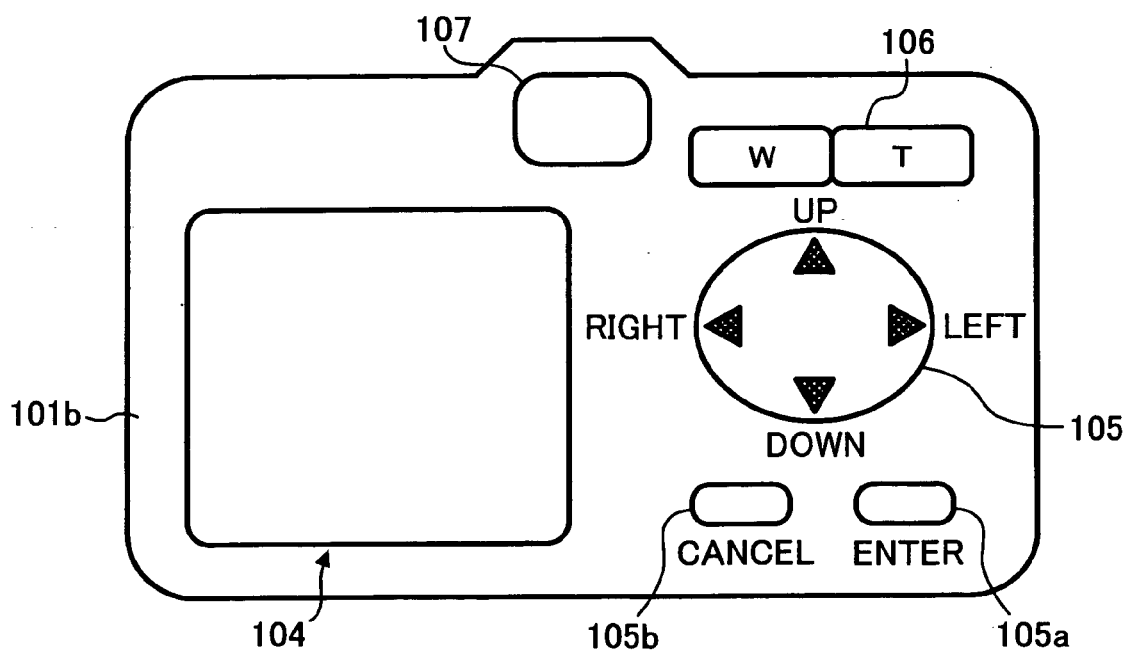
FIG. 1B is a rear view of the digital camera depicted in FIG. 1A.
Figure 1C:
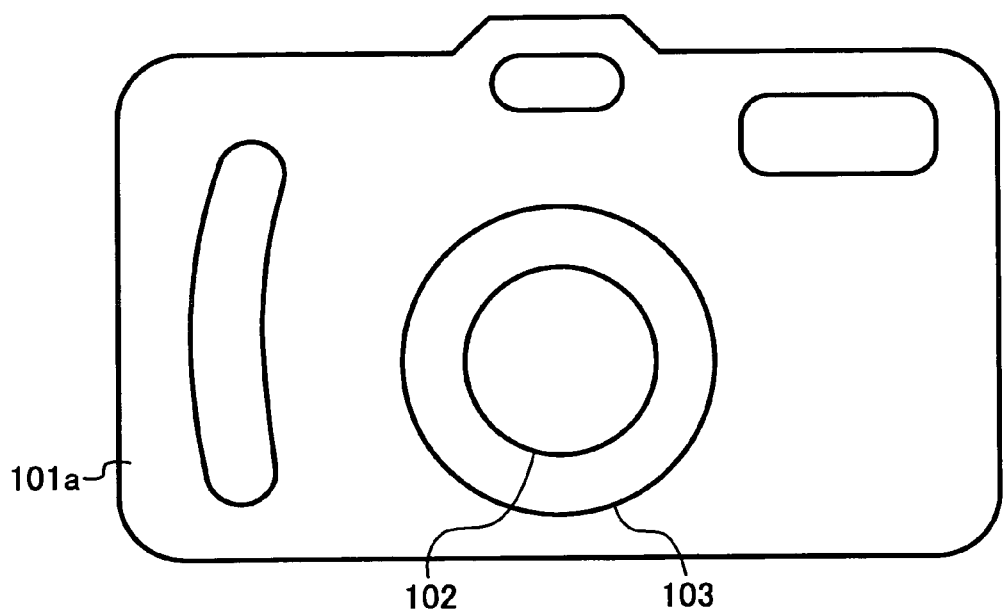
FIG. 1C is a front view of the digital camera depicted in FIG. 1A.
Figure 1D:
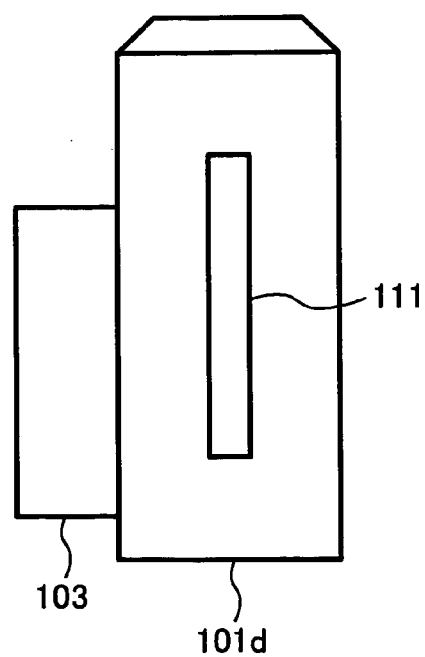
FIG. 1D is a right side view of the digital camera depicted in FIG. 1A.

In describing preferred embodiments illustrated in the drawings, specific terminology is employed for the sake of clarity. However, the disclosure of this patent specification is not intended to be limited to the specific terminology selected and it is to be understood that each specific element includes all equivalents that operate in a similar manner.

An outside view of a digital still camera 101 as an image-capturing apparatus relating to the embodiment of the present invention is shown in FIGS. 1A-1D. At a front surface 101a of the digital still camera 101, there is provided a photographing lens 102 and a lens body 103.

At back surface 101b of the digital camera 101, there is provided a display device 104, an operating button 105, an ENTER button 105a, a CANCEL Button 105b, a zooming button 106 and a viewfinder 107. The display device 104 is composed of a liquid crystal display, an electro luminescence display, a field emitting display or the like, and displays the subject when photographing or playing and displaying a photographed image. The operating button 105 carries out various operations such as a photographing condition setting, photographing mode changing or selecting of played image or the like.

Other than a normal mode for carrying out a normal photographing, the digital camera 101 has various photographing modes such as a self-timer mode in which the photographing is carried out after a certain time has passed after pressing a shutter release button, a close photographing mode for photographing by going close to the subject, a remote control photographing mode for carrying out the photographing by receiving a photographing signal from the remote control device, or an interval photographical mode for carrying out the photographing repeatedly in every predetermined time interval after the shutter release button is pressed. The changing of those photographing modes can be carried out by an operation of the operating button 105.

The ENTER button 105a and the CANCEL button 105b are buttons for confirming and canceling the various operations by the operating button 105, and the zooming button 106 is a button for carrying out a zooming operation of a photographing image to the subject. The viewfinder 107 is an observation window for viewing the subject when photographing and it transmits the image of the subject from the front surface 101*a*.

There is provided on an upper surface 101*c* of the digital camera 101 a power button 108, a switching over dial 109, and a shutter release button 110. The power button 108 is a button for carrying out an on-off operation of a main power provided in a body of the digital camera 101, and the switching over dial 109 is for switching between operating modes.

It is possible to switch the operating mode of the digital camera 101 to the photographing mode for photographing a subject, or to a playing mode for playing and displaying the photographed image on the display device 104.

Figure 2:
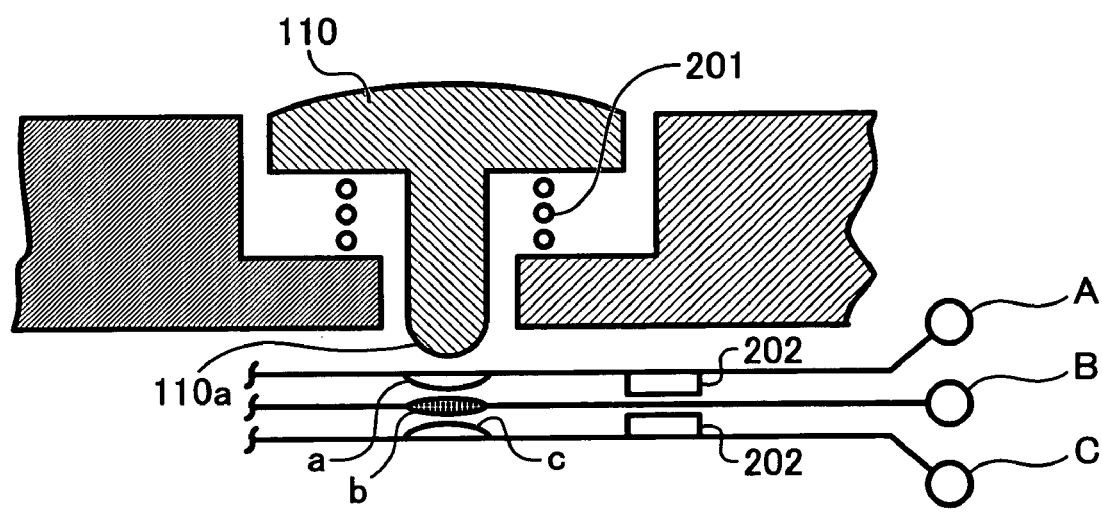
FIG. 2 is an explanatory diagram to describe an inner constitution of a periphery of a shutter release button of the digital camera shown in FIG. 1A.

The shutter release button 110 is retained and biased upwardly by a spring 201 as shown in FIG. 2. Signal lines A-C are arranged in order in such a manner as to overlap above and below at a lower part of a lower end portion 110*a* of the shutter release button 110, and contact points a-c are respectively provided directly under the lower end portion 110*a*. The signal lines A-C are retained so as to provide a certain space by spacers 202 to prevent the contact points a-c from contacting each other when the shutter release button 110 is not pressed.

The signal lines A and B have flexibility. When the shutter release button 110 is pressed downward, first of all the contact points a and b are contacted (half-pressed condition) by flexing of the signal line A which is pressed by the lower end portion 110*a* of the shutter release button 110, and the contact points b and c are contacted (full-pressed condition) by flexing of the signal line B by the further pressing of the shutter release button 110.

The contact points a and b are a part of an inputting device for inputting a focusing starting trigger (means for inputting a focusing starting trigger), and the contact points b and c are a part of an inputting device for inputting a photographing starting trigger (means for inputting a photographing starting trigger). That is to say, the focusing starting trigger is inputted by a short circuit of the signal lines A and B when the contact points a and b are contacted, and the photographing starting trigger is inputted by the short circuit of the signal lines B and C when the contact points b and c are contacted.

At side surface 101*d* of the digital camera 101, there is provided a slot 111 to insert a memory card 320.

Figure 3:
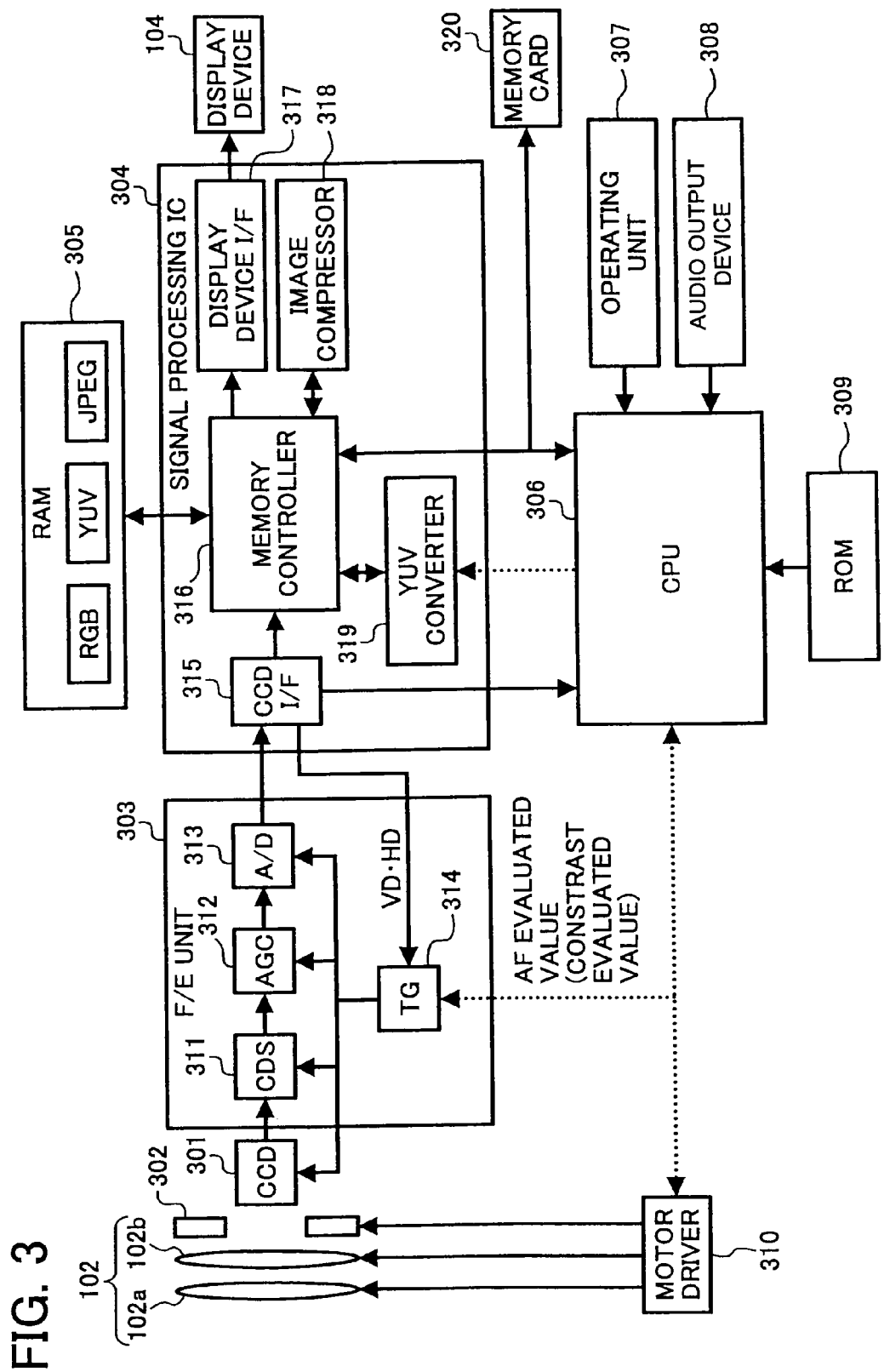
FIG. 3 is a block diagram showing an outline of the inner constitution of the digital still camera shown in FIG. 1A.

FIG. 3 is a schematic block diagram of the digital still camera 101. This embodiment is mainly explained as a digital still camera 101 using a CCD solid image-capturing device 301 with a primary color filter as an image-capturing device. A primary color filter is composed of small filters and each small filter penetrates a light of red, green and blue respectively. However, the present invention can be embodied in a digital still camera using a CCD solid image-capturing device with a complementary color filter. A complementary color filter is composed of small filters and each small filter penetrates a light of Yellow, Cyan, Magenta and Green respectively.

The digital still camera 101 has a photographing lens 102, a mechanical shutter 302, a CCD solid image capturing device 301, a front-end signal processing unit 303, a signal processing unit 304, a RAM (random access memory) 305, a display device 104, a CPU (central processing unit) 306, an operating unit 307, an audio output device 308, a ROM (read-only memory) 309 and a motor driver 310.

Figure 4:
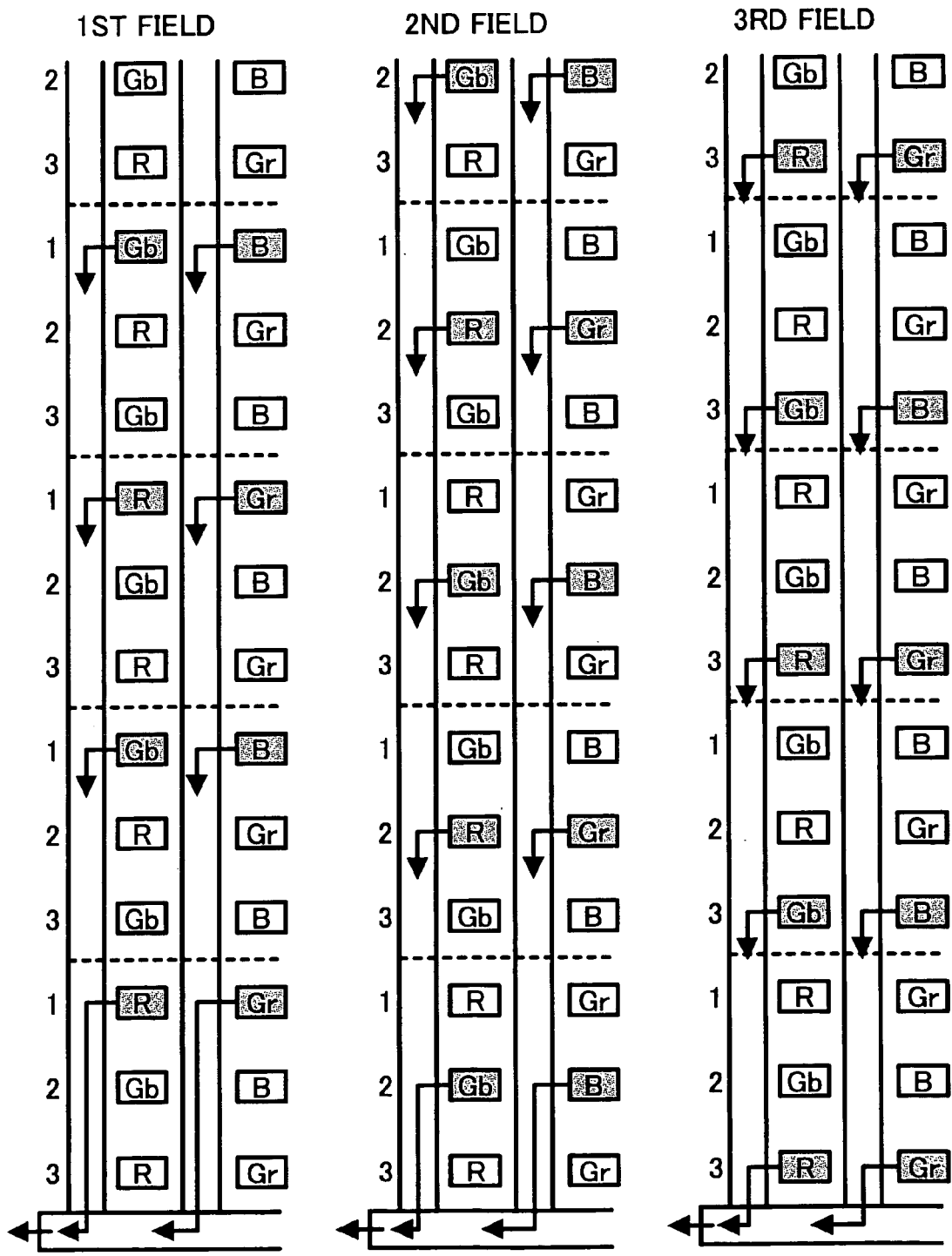
FIG. 4 is a schematic diagram showing how a solid image-capturing device, used in the digital still camera of FIG. 1A, transmits an image with a method of three-fields-interlace transmission.

The photographing lens 102 is an optical system, which focuses a subject image on a light-receiving surface of the CCD solid image-capturing device 301. The mechanical shutter 302 is set between the photographing lens 102 and the CCD solid image capturing device 301, and controls exposure of the CCD solid image-capturing device 301 by shutting the light path. When the mechanical shutter 302 is open, incoming light through the photographing lens 102 exposes the CCD solid image-capturing device 301. When the mechanical shutter 302 is closed, the incoming light is prevented from exposing the CCD solid image-capturing device 302. The CCD solid image-capturing device 302 exchanges incoming a subject image exposed on the light-receiving surface to a frame of electric signals, and holds them temporarily. Then the CCD solid image-capturing device 301 transmits the frame of electric signals with three-fields interlace-transmission. FIG. 4 explains the three-fields interlace-transmission of the CCD solid image-capturing device 301. The CCD solid image-capturing device 301 separates the frame of electric signals into three fields and transmits them serially.

FIG. 5 is a timing chart when a mechanical shutter 302 shuts normally during transmission of the three fields. The shutter is set between a photographing lens 102 and the CCD solid image-capturing device 301, and controls incoming-light to the CCD solid image-capturing device 301.

FIG. 6 is a timing chart when the mechanical shutter 302 fails to close during transmission of the three fields, which shows how much the exposure time of each field changes in comparison to the normal exposure time.

FIG. 7 is a timing chart when the mechanical shutter 302 delayed in closing, which shows how much the exposure time of each field changes in comparison to the normal exposure time.

The front-end signal processing unit 303 has a CDS (correlated double sampling) circuit 311, an AGC (auto gain controller) circuit 312, an A/D (analog-digital) converter 313 and a timing generator 314, and processes signals from the CCD solid image capturing device 301. The CDS circuit 311 processes correlated double sampling to the image signals outputted from the CCD solid image-capturing device 301. The AGC circuit 312 adjusts a signal outputted by the CDS circuit 311 to a proper signal level automatically. The A/D converter 313 converts an analog signal outputted by the AGC circuit 312 to a digital signal. The timing generator 314 generates timing signals in response to VD signals (vertically synchronized driving signal) and HD signals (horizontally synchronized driving signal) and in cooperation with the CPU 306.

The signal processing IC 304 has a CCD interface 315, a memory controller 316, a display device interface 317, an image compressor 318 and a YUV converter 319. The CCD interface 315 inputs the VD and HD signals to the timing generator 314. Thus the timing generator 314 inputs the timing signals to the CCD solid image-capturing device 301, the CDS circuit 311, the AGC circuit 312 and the A/D converter 313, and synchronizes them correctly. The signal processing IC 304 stores digital image data into the RAM 305 and processes one in cooperation with the CPU 306. The memory controller stores digital image data given by the A/D converter 313 in the front-end signal-processing unit 303 to the RAM 305. The image compressor 318 compresses the digital image data. The YUV converter 319 converts the digital image data from in RGB-format to in YUV-format and stores them to RAM 305. The memory controller 316 sends digital image data, outputted by A/D converter 313 or restored from the RAM 305, to the display device 104 through the display device interface 317. The image compressor 318 compresses digital image data outputted by the A/D converter 313 or restored from the RAM 305. The memory controller 316 also stores the digital image data restored from the RAM 305 to the memory card 320.

We can use a semiconductor memory such as SDRAM (synchronous dynamic random access memory) as the RAM 305. The RAM 305 stores raw RGB-format data, converted YUV-format data and compressed JPEG data. The display device 104 can be a device which shows images, such as a LCD (liquid crystal display). The display device 104 receives image data out of the A/D converter 313 through the display device interface 117, or out of the RAM 205. And, the display device 304 indicates an abnormality and a way to dealing with the abnormality when the abnormality occurs as described below. The motor driver 310 drives a motor to move the photographing lens 102 for focusing or zooming under the control of the CPU 306. The motor driver 310 also drives a motor opening or closing the mechanical shutter 302 in cooperation with the timing generator 314 under control of the CPU 306. The operating portion 307 is composed of the power button 108, the switching over dial 109, the shutter release button 110, the operating button 105, the ENTER button 105a, the CANCEL Button 105b and the zooming button 106. The operating portion 307 sends signals to the CPU 306 to control actions of the digital still camera 101. The shutter release button 110 sends a signal to take a picture. The mode switch sends a signal to select a mode from several modes, such as a photographing mode, a self-timer mode, a setting preference mode, a reproduction mode and so on. The audio reproduction device 308 announces an abnormality and a way to deal with the abnormality by voice when the abnormality occurs. It also announces a way to use the digital still camera 101 to help a users operation, or tells the time to shoot at the self-timer mode. The memory card 320 is an IC memory type memory with built-in semiconductor nonvolatile memory such as a flash-memory (called a small card). The digital still camera 101 uses the memory card 320 as a detachable external memory. The memory card 320 is attached into the slot 111 of the digital camera detachably. The memory card 320 stores JPEG compressed image data, as a taken picture, out of the RAM 305 through the memory controller 316 under control of the CPU 306.

The CPU 306 controls each device described above and commands a normal procedure to take a picture. The CPU 306 also detects an abnormality of the mechanical shutter 302 based on a difference between at least two fields transmitted from the CCD solid image-capturing device 301 by comparing exposure amounts of these fields. The ROM 309 stores programs executed by the CPU 306 to control each device of the digital still camera 101.

In FIG. 3, the CCD solid image-capturing device 301 converts an optical image received on the receiving surface through the photographing lens 102 to a frame of electric signals, and generates a frame of analog image signals corresponding to the optical image. FIG. 4 explains a way to transmit the analog image signals from the CCD solid image-capturing device 301. The CCD solid image-capturing device divides the frame of analog image signals into three fields, and transmits the three fields serially. The front-end signal-processing unit 303 converts the transmitted analog image signals to digital image signals with correlated double sampling by CDS circuit 311, auto gain control by AGC circuit 312 and analog-digital conversion by A/D converter 313. The front-end signal-processing unit 303 sends the digital image signals to the signal-processing IC 304. The signal-processing IC 304 receives the digital image signals through the CCD interface 315 and sends the signals to RAM 305 through the memory controller 316. At this time, the CCD interface 315 sums up each signal value of R (red), Gr (green in red line), Gb (green in blue line) and B (blue), respectively, for each divided area of a frame and for each field of digital image signals. For instance, we can divide a frames to 256 areas by sixteen horizontally and vertically.

The CPU 306 uses the sum to figure out a control-value such as a control-value for auto white balance. The signal-processing IC 304 converts a raw RGB-format data, having all three fields of a frame transmitted and stored in the RAM 305, to YUV-format data with YUV converter 319. YUV is the color space expressed by the luminance component (the brightness) Y and the chrominance (color) components U, V. Then the signal-processing IC 304 sends the YUV-format data to the RAM 305 through the memory controller 316 again. During this conversion, the YUV converter 319 uses the control-value figured by the CPU 306. And then the signal-processing IC 304 reads the YUV-format data out of the RAM 305 once again and compresses the data to JPEG compression format data with image compressor 318 and sends the data back to the RAM 305. The CPU 306 adds header data to the JPEG compression format data, formats the data as formatted data such as Exif (Exchangeable image file format) data and stores the data into the memory card 320. Exif data includes metadata such as information about a photographing condition.

FIG. 4 is a schematic diagram showing an order to transmit each field when the CCD solid image-capturing device 301 transmits a frame of image signals by divided three fields as an interlace-transmission. The CCD solid image-capturing device 301 divides a frame of image signals into three fields by grouping each three lines vertically and transmits them serially in three times. As shown in the timing chart of FIG. 5, the mechanical shutter 302 closes when an exposure has finished. Thus the mechanical shutter 2 shuts incoming light from exposure of the receiving surface of the CCD solid image-capturing device 301. Then there is no difference between each exposure time of field when the mechanical shutter 302 shuts normally.

On the other hand, some difference comes up between each exposure time of field when the mechanical shutter 2 fails to shut, as shown in FIG. 6. In detail, the second field is exposed while the first field is being transmitted, which makes the exposure time of the second field longer than the exposure time of the first field by the transmitting time of the first field. Additionally, the third field is exposed while the first and second field are being transmitted, which makes the exposure time of the third field longer than exposure times of the first and the second field by the transmitting time of the first and second field. Therefore the exposure time of the third field is the longest in the output of the CCD solid image-capturing device 301. Thus the value of the third field, exposed for the longest time, becomes the highest level in the output of the CCD solid image-capturing device 301. This difference makes a difference of RGB sums figured by the signal processing IC 304 between each field. The CPU 306 detects a difference of exposure time when it finds that a difference of the RGB sum is bigger than a threshold value. Then it commands the display device 104 to indicate an abnormality and a way to deal with the abnormality through the display device interface 317. And it commands audio output device 308 to play sounds for alert such as a beep.

The exposure time of the first field is different from the exposure time of the second and third field when the mechanical shutter 302 delays shutting, as shown in FIG. 7. In detail, the second and the third field are exposed after the first field starts to be transmitted. It makes the exposure time of the second and third field longer than the exposure time of the first field by the delayed time of the mechanical shutter 302. Therefore, the exposure time of the second and the third field are the longest in the output of the CCD solid image-capturing device 301. Thus, the second and the third field, exposed for longer time, have a higher level than the first field. This difference also makes a difference in RGB sum figured by the signal processing IC 304 between each field. The CPU 306 detects a difference in exposure time when it finds that a difference of the RGB sums is bigger than a threshold value. Then it commands the display device 104 to indicate an abnormality and a way to deal with the abnormality through the display device interface 317. And it commands audio output device 308 to play sounds for alert such as a beep.

In this embodiment, an abnormality is detected by comparing levels of the sums of each color area of the elementary color filter transmitted from the CCD solid image-capturing device 301. However, an abnormality can alternatively be detected by the CPU 309 reading a data stored in the RAM 305 and comparing levels thereof. An abnormality can also be detected by comparing levels of averages of the similar areas. An abnormality can be detected by comparing levels of sums or averages of brightness derived from raw RGB format data.

The above embodiment utilizes a three-fields interlace-transmission, however, an abnormality can be detected in a case of two-fields interlace transmission, or greater than three fields interlace-transmission in the same manner. Furthermore, the above embodiment utilizes a CCD solid image-capturing device 301 with a color filter, however, the present invention can be used with a monochrome CCD.

For more detail, several more preferred embodiments are described below.

For instance, a difference of exposure amount due to a difference in exposure time also happens when light leaks into a light path to an image-capturing device because of breakage or defect of an optical part such as lens body 103. In this case, the difference between the first field and the third field is biggest in a three-fields transmission. Therefore, the abnormality can be found by estimating data of first and second fields or the difference between the first and third fields. In this case, the data of the first and the third fields are utilized. However, the abnormality can alternatively be found by comparing the first and the second fields, or the second and the third fields.

An abnormality can be detected by comparing any pair of the three fields when the mechanical shutter 302 does not shut at all, as described above. This is because each two of exposure amounts of three fields are different. However, an abnormality cannot be detected by comparing the second and the third fields when the mechanical shutter 302 delays shutting a little bit as shown in FIG. 7. But, an incorrect timing of the mechanical shutter 302 can be determining by comparing the second and the third fields after an abnormality is found by comparing the first and the second fields or the first and the third fields.

For more accurate detection of an abnormality, the sums of data of a plurality of specified areas in the compared fields can be used. If only one area is specified as the area of interest and, for instance, the value of the area is so big that it is saturated, then cannot be detected. For dealing with such situation, one frame is divided into 256 areas by sixteen horizontal rows and sixteen vertical columns, and R, G and B values are respectively summed up in each of the 256 areas. The CPU 306 chooses four areas at the corners and five areas at the center and compares the fields. Such a procedure prevents the problem of saturation. Alternatively, the sums of brightness outputted by the YUV converter 319 can be used.

Alternatively average values can be used instead of sums. The CPU can process such values quicker because the average value has fewer digits than the sum, thereby reducing overhead in data transmission.

The R, G and B values are respectively summed as described above, and the most sensitive color is used in comparing the values. Such a procedure allows for the detection of a slight leak of light. The R, G and B values can also be compared independently. For instance, if a photographing subject is blue, the data will be too big, or the green and red data will be too small. To compare all color data of R, G and B independently, allows for the detection of an abnormality independent of the color of photographing subject. Or, the most and the least sensitive color both can be used in comparing the data. An abnormality can be detected by using the least sensitive color even if the most sensitive color is saturated.

An abnormality can be detected in the same way described above in the case of a CCD solid image-capturing device 301 with a complementary color filter system, as well as with the filter of an elementary color system.

As described above, the biggest difference is usually the difference between the first and the last field in a frame when the difference of exposure time exists. Therefore, an abnormality can be detected by comparing the first and the last fields.

The threshold value for detecting abnormality should be changed depending on a specified exposure time for photographing. In FIG. 6, the longer the exposure time, the less influence of the difference of the exposure time. Thus, a threshold value should be reduced for detecting abnormality when the exposure time is long. Furthermore, if the specified exposure time is too long, it is difficult to determine whether the difference comes from just noise or the difference of exposure time. Therefore, detection of abnormality should not be performed. For instance, the threshold value is specified with a larger value in order not to detect abnormality substantially.

Alternative ways can be used to inform a user of the occurrence of an abnormality, as described below. A camera, such as a digital still camera, usually has a display device. The display device can be used to indicate an abnormality and a way to deal with the abnormality such as a way to contact a repairer. However, when a user turns the display device off or does not see the display, then an audio output device 308 can also be used to beep or to announce a guide in order to avoid the user failing to recognize that an abnormality exists.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

The present invention thus also includes a computer-based product which may be hosted on a storage medium and include instructions which can be used to program a microprocessor to perform a process in accordance with the present invention. This storage medium can include any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

This patent specification is based on Japanese patent application, No. JPAP2003-421498 filed on Dec. 18, 2003, in the Japanese Patent Office, the entire contents of which are incorporated by reference herein.

What is claimed is:

1. A image-capturing apparatus, comprising:
an image-capturing device configured to receive an optical image having at least two dimensions, said image-capturing device being configured to convert the optical image to electric signals, divide a frame of the electric signals into a plurality of fields, and transmit the fields of electric signals serially; and
a shutter configured to control exposure and an exposure time of said image-capturing device; and
a detecting device configured to detect both an abnormality of said shutter and a light leakage into a light path to said image-capturing device by comparing at least two of the transmitted fields of electric signals.

2. The apparatus according to claim 1, further comprising:
a device which is configured to compute sums of the electric signals for a plurality of specified areas of the frame,
wherein said detecting device is configured to detect said abnormality by comparing at least two of the sums.

3. The apparatus according to claim 1, further comprising:
a device which is configured to compute averages of the electric signals for a plurality of specified areas of the frame,
wherein said detecting device is configured to detects said abnormality by comparing at least two of the averages.

4. The apparatus according to claim 1, wherein:
said image-capturing device has an elementary color filter configured to filter the optical image prior to receipt by said image-capturing device; and
said detecting-device is configured to detect said abnormality based on the electric signals of at least one color.

5. The apparatus according to claim 1, wherein:
said image-capturing device has a complementary color filter; and
said detecting device is configured to detect said abnormality based on the electric signals of at least one color.

6. The apparatus according to claim 1, wherein said detecting device is configured to detect said abnormality by comparing a first field and a last field.

7. The apparatus according to claim 1, wherein:
said detecting device is configured to detect said abnormality by comparing the difference with a specified threshold.

8. The apparatus according to claim 7, wherein said detecting device is configured to change the threshold according to a specified exposure time.

9. The apparatus according to claim 1, further comprising a display device which is configured to indicate that said abnormality is occurring when said detecting device detects said abnormality.

10. The apparatus according to claim 1, further comprising a display device configured to indicate an instruction or information to deal with said abnormality when said detecting device detects said abnormality.

11. The apparatus according to claim 1, further comprising an audio output device configured to announce said abnormality is occurring by voice or sound when said detecting device detects said abnormality.

12. The apparatus according to claim 1, further comprising an audio output device configured to announce an instruction or information on how to deal with said abnormality by voice or sound when said detecting device detects said abnormality.

13. A image-capturing apparatus, comprising:
means for receiving an optical image having at least two dimensions, said receiving means being configured to convert the optical image to electric signals, divide a frame of the electric signals into a plurality of fields, and transmit the fields of electric signals serially;
shutter means for controlling exposure and an exposure time of said image-capturing device; and
means for receiving the electric signals, and for detecting both an abnormality of said shutter means and a light leakage into a light path to the means for receiving by comparing at least two of the transmitted fields.

* * * * *